United States Patent [19]

Yada et al.

[11] 4,404,638
[45] Sep. 13, 1983

[54] FLOW RATE MEASURING DEVICE

[75] Inventors: Tetsuo Yada, Zama; Takeo Wada, Kawasaki, both of Japan

[73] Assignee: Tokico Ltd., Kawasaki, Japan

[21] Appl. No.: 217,391

[22] Filed: Dec. 17, 1980

[30] Foreign Application Priority Data

Dec. 20, 1979 [JP] Japan .......................... 54-176517[U]

[51] Int. Cl.³ .............................................. G01F 1/08
[52] U.S. Cl. .................................. 364/510; 364/571;
377/21; 73/861.03
[58] Field of Search ...................... 364/509, 510, 571;
235/92 FL; 73/861.01, 861.03

[56] References Cited

U.S. PATENT DOCUMENTS

| | | | |
|---|---|---|---|
| 3,610,898 | 10/1971 | Yamamoto | 235/92 FL |
| 3,688,573 | 9/1972 | Garrett | 73/861.03 |
| 3,691,838 | 9/1972 | Kalotay | 73/861.03 |
| 3,807,229 | 4/1974 | Chiles | 73/861.03 |
| 3,822,377 | 7/1974 | Beck | 364/510 |
| 3,831,011 | 8/1974 | Hulme | 364/510 |
| 3,854,038 | 12/1974 | McKinley | 364/510 |
| 3,895,529 | 7/1975 | Moore | 364/510 |
| 3,905,229 | 9/1975 | Togo et al. | 73/861.03 |
| 4,120,032 | 10/1978 | Mirdadian | 364/510 |
| 4,253,156 | 2/1981 | Lisle et al. | 364/510 |

Primary Examiner—Gary Chin
Attorney, Agent, or Firm—Wegner & Bretschneider

[57] ABSTRACT

A flow rate measuring device comprising a counter for counting pulses from a flow rate detector, a detector for detecting the temperature of a fluid to be measured, a difference detector for calculating the difference between the measured temperature from the temperature detector and a reference temperature, an arithmetic operation unit for executing predetermined arithmetic operations using the counted value from the counter, the temperature difference from the difference detector and the constant based on specific gravity, and a pulse generator for generating pulses based on the signal from the arithmetic operation unit.

10 Claims, 3 Drawing Figures

FLOW RATE MEASURING DEVICE

This invention concerns a flow rate measuring device.

Flow rate for a fluid to be measured can be obtained at a high accuracy, for example, in a turbine type flow meter by effecting the correction for the measured flow rate relative to the temperature change in the fluid to be measured according to the following equations specified in ASTM(American Society for Testing Material) (corresponding to JIS K-2250):

$$F = KF_t \tag{1}$$

$$K = 1 + Q_1\Delta t + Q_2\Delta t^2 \tag{2}$$

wherein

F: flow rate after the correction
Ft: flow rate before the correction obtained from the flow rate detetor at temperature t
K: volume conversion coefficient
$Q_1$, $Q_2$: constants specified by the specific gravity of a fluid to be measured as:

$$Q_1 = -P_1/d + P_2$$

$$Q_2 = -P_3/d + P_4$$

where $P_1$, $P_2$, $P_3$ and $P_4$ are constants specified respectively in ASTM or JIS K-2250, and $\Delta t$: difference between a reference temperature (15° C.) and a temperature of a fluid to be measured.

However, since the arithmetic operations for the equations (1) and (2) have been executed in analogous manners, it is difficult to accurately set the volume conversion coefficient K in the case where the changes in the temperature difference $\Delta t$, and the constants $Q_1$ and $Q_2$ are significant and the operations for the equations (1) and (2) have been conducted only for the minor changes in the temperature difference $\Delta t_1$ and in the constants $Q_1$ and $Q_2$, for example, for the value $0.9 \leq K \leq 1.1$. Moreover, since the flow rate detector generally outputs electrical pulse signals, the flow rate $F_t$ is given as a number of pulses and since an electromagnetic counter or the like is emloyed as an indicator for the indication of the measured flow rate, the flow rate F is also given as a number of pulses, and the correction for the determination of the flow rate F has been effected by adding number of pulses based on the correction value to a certain number of pulses representing the flow rate $F_t$ after such a certain number of pulses have been issued. In the addition of the number of pulses based on the correction value to the certain number of pulses for the flow rate $F_t$ after they have been issued, however, a disadvantage is present that if the issue of the pulses for the flow rate $F_t$ from the flow rate detector is stopped before they reach the certain number, the number of pulses based on the correction value can no longer be added then, which causes an error in the measurement.

This invention has been made in view of the foregoing defects in the prior art and the object of the invention is to provide a flow rate measuring device capable of measuring the flow rate at a high accuracy even for the significant changes in the temperature difference $\Delta t$ and in the constants $Q_1$ and $Q_2$, and capable of effecting the accurate correction even when the flow rate detector should stop the issue of the pulses for the flow rate $F_t$ at any pulse number.

This invention provides a flow rate measuring device comprising a counting means for counting the pulses from a flow rate detection means and outputting the counted value, a temperature difference detection means for detecting the difference between the temperature of a fluid to be measured and a reference temperature and outputting the value for the temperature difference, an arithmetic operation means for executing a digital operation: (counted value)+[(one constant×temperature difference value)+(the other constant)×(temperature difference value)$^2$]×counted value, using the counted value, the temperature difference value and the two constants defined by the specific gravity of the fluid to be measured, and a flow rate signal generation means for outputting a flow rate signal based on the operation result from the arithmetic operation means.

According to the flow rate measuring device of this invention, since the temperature is always corrected automatically, the flow rate can be measured at a high accuracy even for the significant changes in the temperature and, moreover, since the corrected flow rate signal can be generated irrespective of the presence or absence of the flow rate pulses before the correction, an optimum flow rate signal can be generated even when the supply of the flow rate pulses before the correction is interrupted at any instance. In addition, since two constants corresponding to the specific gravity can optionally be set by the designation of the specific gravity, the flow rate can be measured for various fluids of different specific gravities.

This invention is to be explained by way of its preferred embodiments in conjunction with the accompanying drawings, by which the foregoing objects and features, as well as other objects and features of this invention will become more clear.

Figure 1:
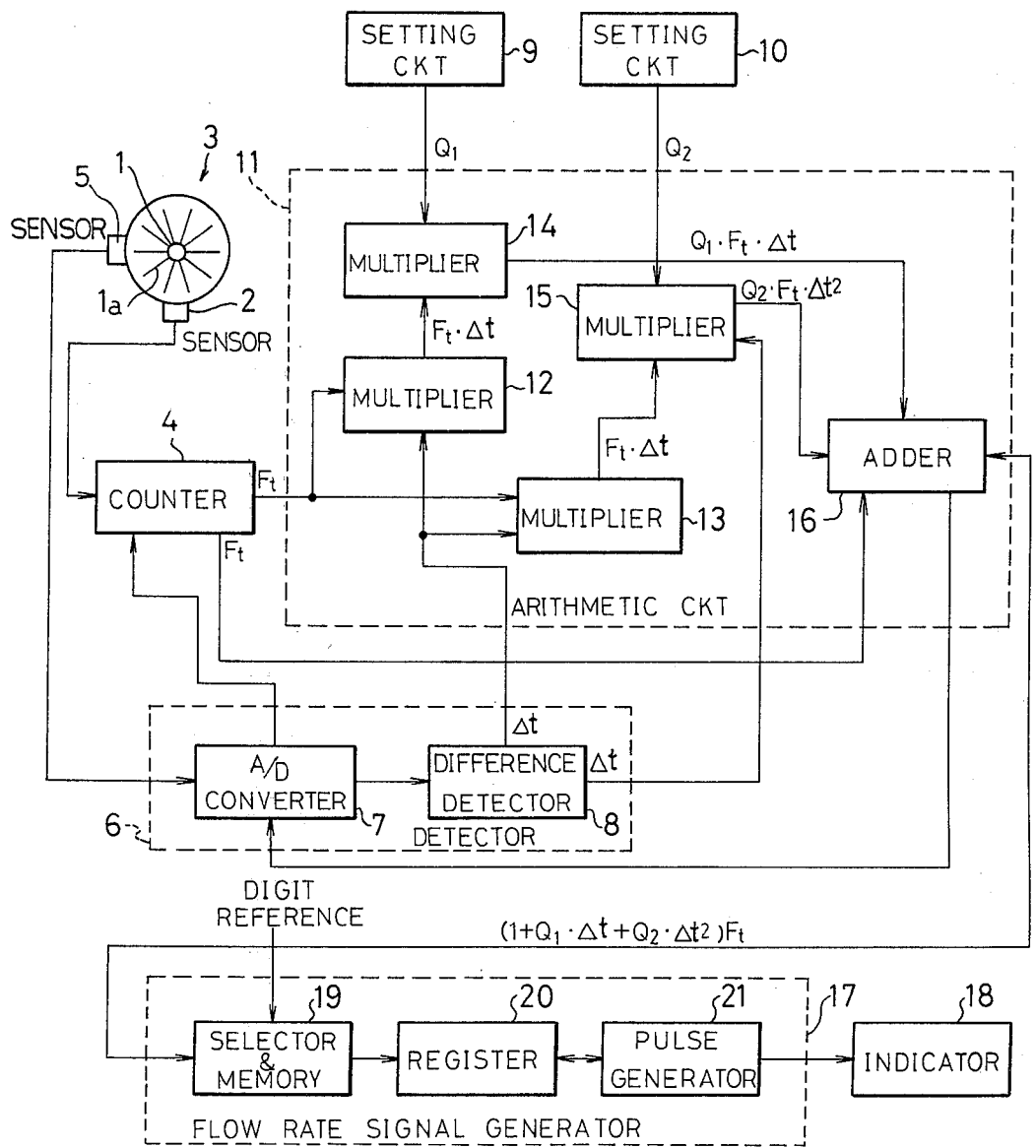
FIG. 1 is a block diagram showing one preferred embodiment according to this invvention.
Figure 2:
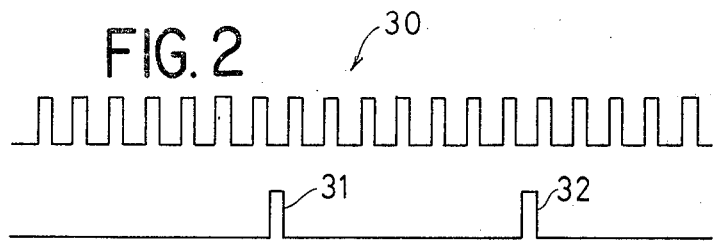
FIG. 2 is a time chart for the operation of the embodiment shown in FIG. 1.

In FIG. 1, a flow rate detector 3 comprising an impeller 1, a pick-up coil 2 that electromagnetically detects the passage of blades 1a of the impeller and generates an electrical pulse on every passage of one blade and the like supplies generated flow rate pulses to a counter 4. The means for detecting the passage of the blades may comprise, instead of the pick-up coil, a pair of electrodes disposed in the vicinity of the blades and adapted to detect the passage of the blades by the change in the electrostatic capacitance between the electrodes. A temperature detector or sensor 5 comprising of a thermosensitive resistor measures the temperature of the fluid whose flow rate is to be measured by the flow rate detector 3, and supplies the measured value to a temperature difference detector 6. A counter 4 counts pulses supplied from the flow rate detector 3 and outputs the counted value as the flow rate $F_t$ before the correction. The temperature difference detector 6 comprises an analog to digital converter 7 that converts the measured value supplied from temperature detector 5 in the form of an analog signal into the measured value in the form of a digital signal and a temperature difference detector or arithmetic device 8 that determines the difference $\Delta t$ between the measured value from the converter 7 and a predetermined reference temperature, for example, 15° C. by way of digital operation. An arithmetic operation circuit 11 comprises multipliers 12, 13, 14 and 15 and an adder 16 and executes a digital operation:

(counted value) + [(one constant × temperature difference value) + (the other constant) × (temperature difference value)$^2$] × counted value, which corresponds to the equation (1) referred to above using the counted value $F_t$ from the counter 4, the temperature difference value $\Delta t$ from the temperature difference detector 8, the constants $Q_1$ and $Q_2$ defined by the specific gravity from the constant setting circuits 9 and 10. The multipliers 12 and 13 execute multiplication for the counted value $F_t$ from the counter 4 and the temperature difference value $\Delta t$ from the detector 8 respectively, the multiplier 14 executes the multiplication for the constant $Q_1$ from the setting circuit 9 and the multiplication result $F_t \times \Delta t$ from the multiplier 12, the multiplier 15 executes the multiplication for the multiplication result $F_t \times \Delta t$ from the multiplier 3, the constant $Q_2$ from the setting circuit 10 and the temperature difference value $\Delta t$ from the detector 8, and the adder 16 executes addition between the counted value $F_t$ from the counter 4 and the respective multiplication results $Q_1 \times F_t \times \Delta t$ and $Q_2 \times F_t \times \Delta t^2$ from each of the multipliers 14 and 15. A flow rate signal generation circuit 17 comprises a selector 19, a register 20 and a pulse generator 21 and outputs a flow rate signal $(1 + Q_1\Delta t + Q_2\Delta t^2)F_t$ as the result of the addition from the adder 16 to an indicator 18 comprising an electromagnetic counter or the like. The selector 19 sends, to the register 20, such a part of the addition result from the adder 16 that is equal to or greater than a reference digit set by an external means and temporarily stores other part of the addition result that is smaller than the reference digit. Specifically, in the case where the lowermost indication digit is, for example, $10^1$ in the indicator 18, $10^1$ is externally set as the reference digit to the selector 19. When the addition result from the adder 16 converted into a decimal number of, for example, "215.5" is inputted to the selector 19, the selector 19 sends out a binary number corresponding to "21" to the register 20 and, at the same time, stores the binary number corresponding to the remaining "5.5." The binary number corresponding to "5.5" stored in the selector is added to the next addition result sent from the adder 16 and the binary number in the addition value that is equal to or larger than the $10^1$ digit is supplied to the register 20 and the remaining binary number smaller than the $10^1$ digit is again stored in the selector. The register 20 stores the binary number selected by the selector 19 and subtracts the stored number, correspondingly, on every output of the pulse from the generator 21 to the indicator 18. That is, in the foregoing case, when the binary number " . . . 10101" corresponding to the decimal number "21" is stored in the register 20, the value stored in the register 20 is successively subtracted as " . . . 10100," " . . . 10011" on every generation of the pulse from the signal generator 21 to the indicator 18. The generator 21 outputs pulses at a predetermined period to the indicator 18 unless the binary number stored in the register 20 is zero. The period of the pulses outputted from the pulse generator 21 to the indicator 18 is predetermined based on the responsiveness of the indicator 18. For instance, in the case where the indicator comprises a usual electromagnetic counter having a decimal indication, the period of pulses inputted to the indicator 18 is set greater than 100 ms. The indicator 18 accumulates the pulses inputted from the pulse generator 21 and indicates the accumulated value in the decimal form. In the case where the $10^1$ digit is designated to the selector 19, the lowermost indication digit in the indicator 18 is $10^1$ digit and thus the indicator 18 indicates the flow rate equal to or greater than $10^1$ digit.

The operation of the flow rate measuring device having the foregoing constitution is to be explained. When a series of flow rate pulses 30 are inputted from the pick-up coil 2 to the counter 4, the counter 4 counts the pulses 30 successively. After the completion of the arithmetic operation in the adder 16 or after the activation of a power sorce, when an instruction pulse 31 is supplied from the adder 16 to the analog to digital converter 7, the converter 7 converts the measured value from the temperature sensor 5 upon supply of the instruction pulse 31 into a digital signal to output it to the temperature difference detector 8 and, after the completion of the conversion, outputs a transfer instruction pulse to the counter 4 and, at the same time, outputs an operation instruction signal to the temperature difference detector, that is, the arithmetic operation device 8. The counter 4, upon receiving the transfer instruction pulse from the converter 7, transfers the counted value to the multipliers 12 and 13 and to the adder 16 and, while on the other hand, starts to count the pulses 30 after the arrival of the pulse 31 by resetting the value counted so far. The arithmetic operation device 8, upon receiving the operation instruction pulse from the converter 7, calculates the difference between the measured value from the converter 7 and a predetermined temperature and outputs the thus obtained value for the temperature difference to the multipliers 12, 13 and 15 and, at the same time, outputs a multiplication instruction pulse to the multipliers 12 and 13. Upon receiving the multiplication instruction pulse each of the multipliers 12 and 13 executes the multiplication for the counted value and the value for the temperature difference to output the result of the multiplication to the multipliers 14 and 15 respectively and, at the same time, output a multiplication instruction pulse to the multipliers 14 and 15. The multiplier 14, upon receiving the multiplication instruction signal, executes multiplication for the multiplication result from the multiplier 12 and the constant supplied from the setting circuit 9 and, after the end of the multiplication, supplies the multiplication result and an addition instruction pulse to the adder 16. While on the other hand, the multiplier 15, upon receiving the multiplication instruction pulse, executes multiplication for the multiplication result from the multiplier 13, the value for the temperature difference obtained from the arithmetic operation device 8 and the constant supplied from the setting circuit 10 and, after the end of the multiplication, outputs the multiplication result and an addition instruction pulse to the adder 16. The adder 16, upon receiving the addition instruction pulses from the multipliers 14 and 15, executes addition for the respective multiplication results from the multipliers 14 and 15 and the counted value from the counter 4 and, after the end of the addition, outputs the addition result and a selection instruction signal to the selector 19. The selector 19, upon receiving the selection instruction pulse, outputs such a part of the addition result that is equal to or greater than a reference digit externally set thereto to the register 20, while stores therein the other part of the addition result that is smaller than the reference digit. In the case where the addition result is "215.5" in the decimal number, for instance, and the reference digit set to the selector is $10^2$ instead of $10^1$ in the foregoing case, the selector 19 sends a binary number corresponding to "2" to the register 20 and, at the same time, stores therein the binary number corresponding to "15.5." Since the instruction pulse 31 is the first pulse in this case, no part of the addition results from the previous operation is stored in the selector 19 and the selector 19 effects the foregoing operation by, substantially, adding zero to the addition result supplied thereto. Then, when a binary number corresponding, for example, to "2" is stored in the register 20, the pulse generator 21 outputs pulses with a predetermined pulse period to the indicator 18 and the binary number contained in the register 20 is subtracted each by one on every generation of the pulse from the pulse generator 21. Consequently, when two shots of pulses are generated from the generator 21 to reduce the value contained in the register 20 to zero in this case, the sending of the pulse from the pulse generator 21 is stopped. Since $10^2$ is set as the reference digit to the selector 19, the lowermost digit in the indicator 8 is $10^2$ digit and the indication "2" appearing on the indicator 18 actually means the flow rate of "200" in this case. Thereafter, the foregoing operation is repeated by the input of the instruction pulse 32 to the analog to digital converter 7 again. The part of the previous addition result having been stored in the selector 19 is added to the present addition result obtained from the adder 16 after the generation of the instruction pulse 32 and, if the sum is still smaller than the reference digit, the sum is again stored in the selector 19. The operation for the arithmetic operation circuit 11 and the pulse generation circuit 17 is effected at a sufficiently high speed in the period between the succeeding pulses 31 and 32.

Figure 3:
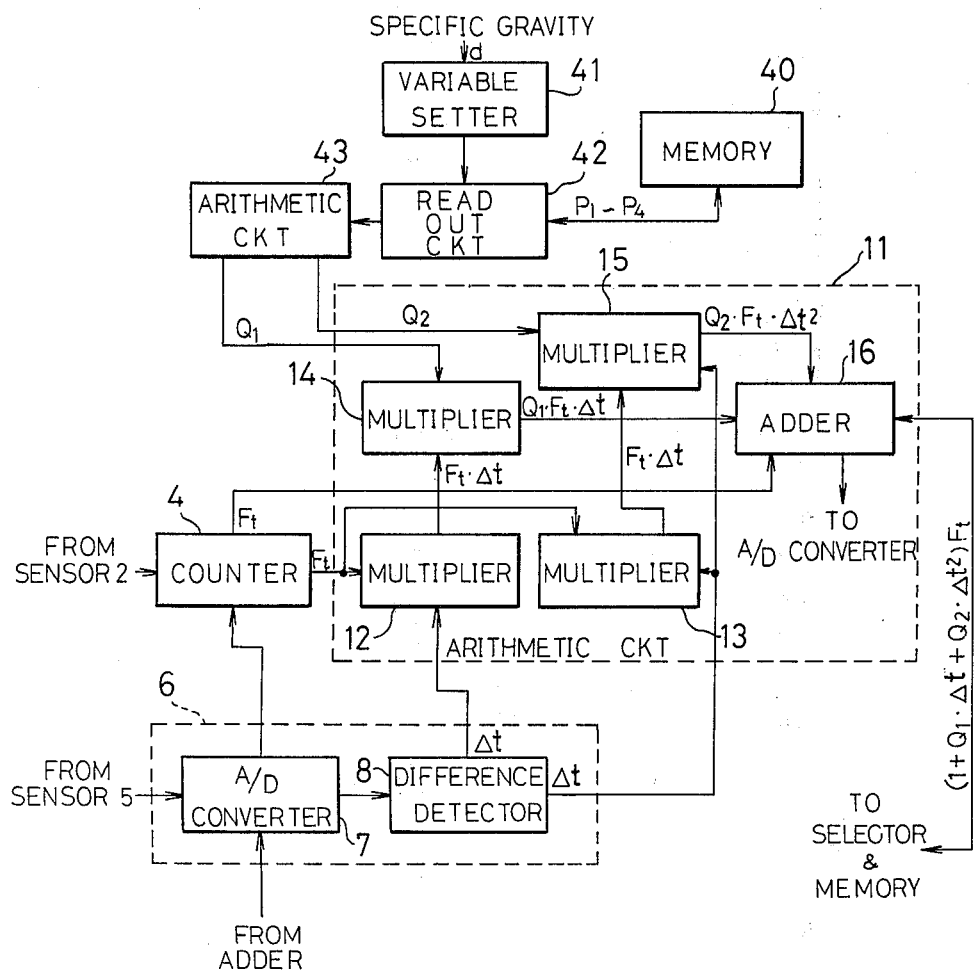
FIG. 3 is a block diagram for another preferred embodiment according to this invention.

The above embodiment in which two constants $Q_1$ and $Q_2$ defined by the specific gravity of a fluid to be measured are previously set in the setting circuits 9 and 10 may, alternatively, be modified as shown in FIG. 3, wherein four constants $P_1$, $P_2$, $P_3$ and $P_4$ defined by various specific gravities are previously stored in a memory circuit 40, the four constants $P_1$, $P_2$, $P_3$ and $P_4$ corresponding to respective specific gravities designated by a variable setter 41 comprising a switch or the like are read out from the memory circuit 40 by way of a read out circuit 42, and the values $Q_1$ and $Q_2$ based on the specific gravity are calculated in a $Q_1$, $Q_2$ arithmetic circuit 43, which are supplied respectively to the corresponding multipliers 14 and 15. According to the above modification, wherein various four constants $P_1, \ldots P_4$ are previously stored in the memory circuit, so that two constants $Q_1$ and $Q_2$ corresponding to the specific gravity of the fluid to be measured can be supplied to the multipliers 14 and 15, accurate instrumentation is possible for the flow rates of fluids to be measured having substantially different specific gravities.

Furthermore, although a turbine type flow meter comprising an impeller is illustrated as the flow rate detection means in this embodiment, various other types of flow meters may be employed to the flow measuring device according to this invention, such as a positive displacement flowmeter having an oval gear or a vortex flowmeter for the detection of von Karman's vortex street.

What is claimed is:

1. A flow rate measuring device, comprising:

first generating means for generating a pulse in response to a fluid flow to be measured,
counting means for counting the generated pulses from said first generating means and generating a counted value for said pulses,
detecting means for detecting the difference between the temperature of the fluid and a reference temperature,
arithmetic operating means for executing a digital operations as follows:

$$F_t + [(Q_1) \cdot \Delta T + (Q_2) \cdot \Delta T^2] \cdot F_t$$

where
$F_t$ is the counted value from said counting means,
$Q_1$ and $Q_2$ are constant values defined with the specific gravity of the fluid respectively, and $\Delta T$ is a value from the temperature difference from said detecting means; and
second generating means having adding means for adding a result value of the operation from the arithmetic operation means to a previous result value of the operation supplied thereto, the previous result value being smaller than a reference value, dividing means for dividing the added result value from said adding means by said reference value into a first value which is smaller than the reference value and a second value which it not less than the reference value, means for storing the first value from said dividing means and for supplying to said adding means the previously stored first value as said previous result value of the operation, and producing means for producing a flow rate signal based on the second value from said dividing means.

2. The flow rate measuring device of claim 1, in which said first generating means comprises an impeller having blades and a sensor for generating the pulse in response to each passage of a blade.

3. The flow rate measuring device of claim 2, in which said sensor comprises a pick-up coil for detecting the passage of the blades electromagnetically.

4. The flow rate measuring device of claim 2, in which said sensor comprises a pair of electrodes for detecting the passage of a blade electrostatically.

5. The flow rate measuring device of claim 1, wherein said detecting means comprises a sensor for detecting the temperature of the fluid, an analog-to-digital converter for converting an analog electrical signal representing the temperature of the fluid produced from said sensor into a digital electrical signal representing the temperature of the fluid, and a detector for detecting the difference between the digital electrical signal produced from said analog-to-digital converter and the reference temperature, which is previously set.

6. The flow rate measuring device of claim 1, in which said arithmetic operating means comprises a first multiplier for multiplying the counted value from said counting means and the value for the temperature difference from said detecting means, a second multiplier for multiplying the value for the multiplication result from said first multiplier and one of the constant values, which are previously set, a third multiplier for multiplying the value of the multiplication result from said first multiplier, the value for the temperature difference from said detecting means and the other of the constant values, and an adder for adding the respective multiplication results from said second and the third multipliers and the counted value from said counting means.

7. The flow rate measuring device of claim 1, in which said producing means comprises a register for containing the second value from said dividing means and a pulse generator for generating a pulse as the flow rate signal when said register contains the value other than zero.

8. The flow rate measuring device of claim 7, in which the value contained in the register is reduced on every generation of the pulses from said pulse generator.

9. The flow rate measuring device of claim 1, which further comprises a setting means capable of setting said constant values in a variable manner by way of the specific gravity of the fluid to be measured.

10. A flow rate measuring device comprising:
first generating means for generating a pulse in response to a fluid flow to be measured;
counting means for counting the generated pulse from said first generating means;
deflecting means for detecting the difference between the temperature of the fluid and a reference temperature;
arithmetic operating means for executing a digital operation based on the counted value from said counting means and the detected temperature difference from said detecting means to obtain a corrected flow rate in the form of a binary number signal; and
second generating means having adding means for adding a result binary number of the operation from said arithmetic operation means to a previous result binary number of the operation supplied thereto, the previous result binary number being smaller than a reference value, dividing means for dividing the added result value from said adding means by said reference value into a first value which is smaller than the reference value and a second value which is not less than the reference value, means for storing the first value from said dividing means, and for supplying to said adding means the previously stored first value as said previous result binary number of the operation, and producing means for producing a flow rate signal based on the second value from said dividing means.

* * * * *